United States Patent
Berchtold et al.

(10) Patent No.: US 10,154,321 B2
(45) Date of Patent: Dec. 11, 2018

(54) SYSTEM AND METHOD FOR REGISTERING SENSORS USED IN MONITORING-SYSTEMS

(71) Applicant: AGT International GmbH, Zurich (CH)

(72) Inventors: Martin Berchtold, Lindau (DE); Holger Ziekow, Frankfurt (DE); Ulf Blanke, Zurich (CH); Tim Van Kasteren, Barcelona (ES); Alessandro Leonardi, Darmstadt (DE); Jelena Mirkovic, Barcelona (ES); Maximilian Walther, Munich (DE)

(73) Assignee: AGT INTERNATIONAL GMBH, Zurich (CH)

( * ) Notice: Subject to any disclaimer, the term of this patent is extended or adjusted under 35 U.S.C. 154(b) by 586 days.

(21) Appl. No.: 14/720,973

(22) Filed: May 26, 2015

(65) Prior Publication Data

US 2015/0339346 A1    Nov. 26, 2015

Related U.S. Application Data (60) Provisional application No. 62/002,957, filed on May 26, 2014.

(51) Int. Cl.
    *G06F 17/30*    (2006.01)
    *H04Q 9/00*     (2006.01)
    (Continued)

(52) U.S. Cl.
    CPC ............. *H04Q 9/00* (2013.01); *G05B 13/04* (2013.01); *G06F 11/30* (2013.01); *G06N 5/047* (2013.01);
    (Continued)

(58) Field of Classification Search
    None
    See application file for complete search history.

(56) References Cited

U.S. PATENT DOCUMENTS

| | | | |
|---|---|---|---|
| 7,496,545 B2 * | 2/2009 | Chung | G06N 5/047 706/45 |
| 2007/0043803 A1 | 2/2007 | Whitehouse et al. | |

(Continued)

FOREIGN PATENT DOCUMENTS

| | | |
|---|---|---|
| EP | 1441320 | 7/2004 |
| EP | 2565740 | 3/2013 |

OTHER PUBLICATIONS

Bovet Gērome and Hennebert Jean: Distributed Semantic Discovery for web-of-things Enable smart Buildingsble, 6th International Conference on New Technologies, Mobility and Security (NTMS), IEEE, Jan. 1, 2014, pp. 5, XP007923206, ISBN: 978-1-4799-3223-8.

(Continued)

*Primary Examiner* — Anhtai V Tran
(74) *Attorney, Agent, or Firm* — Browdy and Neimark, PLLC (57) ABSTRACT

A computer system, method, and program product for registering sensors, includes an interface to receive a query (Q) related to a specific event for a target system state associated with a specific activity pattern. A decomposer decomposes the query (Q) into semantic expressions (QSe1,QSe2) describing the target system state, and identifies a database entry associated with a semantic expression from the decomposition. A retriever retrieves behavioral data corresponding to the identified database entry, including dependencies between elements that describe the specific activity pattern. The specific activity pattern is associated with multiple (Continued)

activity data structures. A registration component registers a sensor (S1,S3,S4), assigned to the activity data structures.

18 Claims, 10 Drawing Sheets

(51) Int. Cl.
| | | |
|---|---|---|
| G05B 13/04 | (2006.01) | |
| G06F 11/30 | (2006.01) | |
| G06N 5/04 | (2006.01) | |
| G06N 99/00 | (2010.01) | |
| G06Q 10/06 | (2012.01) | |
| G08B 23/00 | (2006.01) | |
| G08B 17/00 | (2006.01) | |
| G08B 21/04 | (2006.01) | |
| G08B 31/00 | (2006.01) | |

(52) U.S. Cl.
CPC ........... *G06N 99/005* (2013.01); *G06Q 10/06* (2013.01); *G08B 23/00* (2013.01); *G08B 17/00* (2013.01); *G08B 21/043* (2013.01); *G08B 21/0492* (2013.01); *G08B 31/00* (2013.01); *G08C 2201/93* (2013.01)

(56) References Cited

U.S. PATENT DOCUMENTS

| | | |
|---|---|---|
| 2010/0161630 A1 | 6/2010 | Moriwaki et al. |
| 2013/0094403 A1 | 4/2013 | Park et al. |
| 2014/0108019 A1* | 4/2014 | Ehsani ............... G10L 21/06 704/275 |
| 2015/0154976 A1* | 6/2015 | Mutagi ............... H04L 12/281 704/275 |

OTHER PUBLICATIONS

Goodwin Caleb and Russomanno David J: "Ontology integration within a service-oriented architecture for expert system applications using sensor networks", Expert Systems, Learned Information Ltd., Abingdon, GB, vol. 26, No. 5, Nov. 1, 2009, pp. 409-432, XP007923204, ISSN: 0266-4720.

International Search Report together with Written Opinion from PCT/EP2015/061550 dated Aug. 19, 2015.

Liu J et al: "Towards Semantic Services for Sensor-rich Information Systems", Proceedings (on CD-Rom) of Workshop on Guaranteed Optical Service Provisioning (GOSP2005), $2^{nd}$ International Conference on Broadent Networks, Jan. 1, 2005, pp. 44-51, XP007923207, ISBN: 978-0-7803-9277-9.

Shahriar Sumon (MD) et al.: "Smart Query Answering for marine Sensor Data", Sensor, Molecular Diversity Preservation International (MDPI), vol. 11, Mar. 3, 2011, pp. 2885-2897, XP007923203, ISSN: 1424-8220, DOI: 10.3390/S110302885.

* cited by examiner

SYSTEM AND METHOD FOR REGISTERING SENSORS USED IN MONITORING-SYSTEMS

CROSS REFERENCE TO RELATED APPLICATIONS

This application claims the benefit of U.S. Provisional Application No. 62/002,957 filed on May 26, 2014, which is hereby incorporated by reference in its entirety.

BACKGROUND

Humans enter, stay in, and leave buildings and like environments (hereinafter referred to as "buildings"). Human behavior can cause unwanted incidents or incidents which may happen where not desired.

The motivation to control incidents often involves safety, security, and energy-saving concerns. For example, fire detection systems detect fire or other hazardous situations; intrusion detection systems detect security-related activities; a system with temperature and light sensors could be used to detect wasteful energy use. Detecting such situations and conditions allows corrective measures to be taken.

Responsive measures can be executed manually or automatically. For example, in the case of intrusion detection, security personnel can check the respective part of the building; in the case of heating and light control, adjusting the respective power levels can be triggered and executed automatically by a computer system. In such cases, a target system state is verified and specific events are triggered in order to retain or attain a target system state.

Generally, deploying such systems in buildings is related to the topic of building automation; buildings equipped with such systems are often called "smart buildings". These systems usually rely on data from sensors monitoring the building. Sensor data is typically analyzed according to simple rules. For example, monitoring systems answer questions like, "Is a certain threshold exceeded?" (e.g., a carbon-monoxide concentration threshold) or "What are the weather conditions?" (e.g., wind intensity).

Simple rules often do not suffice. For example, when evaluating whether an elderly person requires help, sensor data is typically sent to a centralized data processing unit. Such centralized processing can include interfaces to (human) operators for complex decisions. Moreover, the unit is normally located remotely from the building and serves multiple buildings. Thus, a potentially large amount of data has to be sent through networks to the centralized processing unit in order to obtain a decision. A delay in communicating important data can mean that certain critical events actions may be missed (e.g., a timely notification of an emergency condition). Moreover, in the central processing model, technical infrastructure has to be scaled and human operators have to be removed or added when the number of buildings served changes.

Additionally, deploying multiple systems in the same building in order to enable various services may lead to redundant infrastructure. Redundancy increases costs for purchase, installation, and maintenance.

Furthermore, a system may be designed for a specific task. Setting up an adapted or new task for the system may be complex and typically requires a service provider or maintenance organization to undertake the work, because the user is rarely able to comprehend the complex programming requirements of a monitoring system.

SUMMARY

According to embodiments of the present invention, a building is equipped with sensors for monitoring various phenomena, with specific sensors assigned to monitor specific phenomena. Non-limiting examples of sensors include: motion detectors; light sensors electric eyes; gas sensors; and temperature sensors. Mobile sensors can also be available, when carried by people. Smartphones, for example, are able to receive news about phenomena relevant to a specific building; laptops computers, for example, may be able to sense seismic activities.

Various embodiments of the invention provide systems and methods for selecting sensors in a building for monitoring conditions related to a target system state (e.g., no fire hazard). Selection of sensors can be based on user request, behavior of people, and activities that can be monitored by the sensors. The selection may also be based on external requests or requirements, such as health services, fire department, building codes, and the like. Users can interact as well. For example, users can employ an appropriate user interface which may support natural language commands, or through interaction with graphical symbols on a display. In case the target system state has to be restored or attained, an event can be triggered.

Operation of buildings can be automatic and decentralized from a central data processing unit. Moreover, certain embodiments are able to utilize existing sensors or integrate new sensors in order to respond to a user query. These embodiments can be deployed without requiring dedicated new sensors, by dynamically making use of available sensors.

According to an embodiment of the invention, a computer system for registering sensors includes an interface for receiving a user query related to a specific event for a target system state, where the specific event is associated with a particular activity pattern. A decomposer breaks the query into semantic expressions describing the target system state, and identifies a database entry associated with a semantic expression resulting from the decomposition. A retriever gets behavioral data corresponding to the identified database entry and relates elements of the behavioral data describing a specific activity pattern associated with multiple activity data structures. A registration component assigns one or more sensors to the multiple activity data structures.

The behavioral data includes a set of logic rules, which can be represented by a connected graph such as a tree. That is, a tree can be interpreted as a logic rule base.

A rule tree can be represented by the root, nodes, and leaves, where the root and the leaves are specific nodes. The tree can also be represented by an appropriate notation including the root, nodes, and leaves. The root of the tree represents a specific human behavior, while the leaves are associated with specific physical items or human activities that can be monitored by sensors. Other nodes between the root and the leaves can represent physical items as well as instances of the specific human behavior. The structure of the behavioral data structure reflects a semantic relation among all the elements.

The identification of a specific human behavior (i.e., the root) and at least one instance of the human behavior and/or an associated physical item (i.e., nodes) by the retriever, provides information to retrieve one or more paths from the root to respective leaves. The retrieved leaves correspond to a specific activity pattern regarding the root and nodes. That is, a subset of rules can be retrieved by obtaining the paths from the root to the leaves. In case only the root is identified, all paths/leaves are retrieved.

The leaves of the tree are associated with activity data structures. Sensors can be assigned to the activity data structures to monitor a specific activity or an activity performed within a specific context. Activity data structures are not required to have relations among themselves.

An activity pattern is associated with multiple activity data structures. The activity pattern can be derived from the retrieved leaves. Because only a portion of the tree of the behavioral data provides paths to the retrieved leaves (complying with the semantic expressions of the query), the remaining portion of the tree can be disregarded. That is, the semantic interpretation of the query by the decomposer is fully represented by the activity pattern. Since the leaves are associated with the activity data structures, the sensors required for monitoring the target system state obtained from the query can be registered. "Registering" a sensor means to store a mapping between the behavioral data and respective sensors assigned to the activity data structures obtained from the activity pattern. The mapping can be implemented, for example, by the system registering the Internet protocol address (IP address) of a sensor. In general, a mapping can be realized by storing a pointer or any other identifier in the computer system.

Reducing the number of potential paths in the behavioral data in compliance with semantic expressions derived from the original query allows selecting only a relevant subset of all available sensors. This helps to reduce energy consumption at the sensor level because sensors not required in the context of the received query can stay in a sleep mode. Further, the required bandwidth for communication between the sensors and the system may be reduced as less sensor data is received (only from registered sensors).

In summary, the computer system processes a complex query, such as a natural language query, which corresponds to the assessment of a target system state and an event. The assessment utilizes the integration of behavioral data (e.g., obtained from human behavior models) with activity data structures (e.g., obtained from context and activity models) and the respective associated sensors. The system can, therefore, be used by an ordinary user for flexibly-defining tasks associated with monitoring buildings. The task definition is independent of specifically-dedicated sensors. Thus, sensors which might be already used by other monitoring-systems, or sensors which are available because of other reasons can be reused. Newly added sensors can also be utilized.

In another embodiment of the invention, the computer system comprises a first interface for receiving sensor data, an inference component to compare the sensor data with a specific activity pattern, and a second interface for triggering the specific event in case there is a certain correlation between the sensor data and the specific activity pattern.

Sensor data received by the first interface is processed by the inference component, which communicates with the behavioral data and the activity data structures. That is, the inference component has knowledge about the specific activity pattern (which is retrieved by the retriever) and the associated activity data structures. By comparing sensor data to the respective activity data structures, the inference component determines whether the specific activity pattern can be matched. If it can be matched, the inference component triggers the event obtained by the decomposer from the user query. Since the inference component utilizes the activity pattern, and the activity pattern is retrieved from behavioral data having semantic relations between its elements, the event is basically the result of a semantic conclusion. The event can be communicated via a second interface component.

In a further embodiment, the computer system further includes a generator and/or updater configured to generate new and/or existing behavioral data based on the query and the plurality of activity data structures. The generator processes semantic expressions (identified by the decomposer) and the activity data structures to generate new behavioral data. That is, the generator uses decomposed semantic expressions and activity data structures as input for classifying this data into the elements of new behavioral data. Alternatively, the updater modifies existing behavioral data based on the input. In other words, the updater, for example, adds new elements to the behavioral data and/or creates new relations between existing elements.

The generator and updater can be implemented by machine learning algorithms. Moreover, a third interface for communicate an additional query to a user can be used in order to request required data. That is, the third interface requests feedback from the environment in order to improve machine learning.

BRIEF DESCRIPTION OF THE DRAWINGS

The subject matter disclosed may best be understood by reference to the following detailed description when read with the accompanying drawings in which.

For simplicity and clarity of illustration, elements shown in the figures are not necessarily drawn to scale, and the dimensions of some elements may be exaggerated relative to other elements. In addition, reference numerals may be repeated among the figures to indicate corresponding or analogous elements.

DETAILED DESCRIPTION

Figure 1:
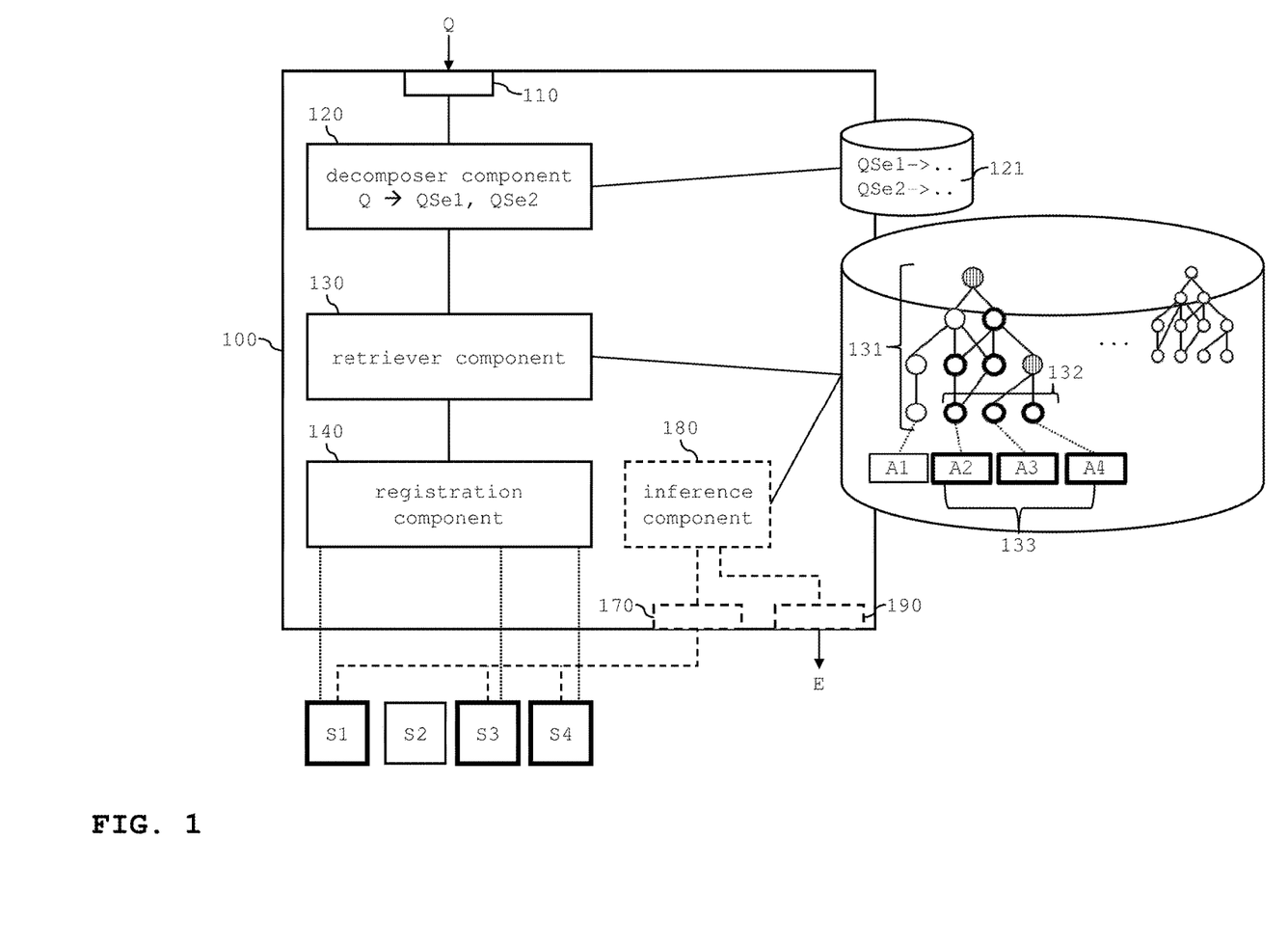
FIG. 1 shows a system for registering sensors according to an embodiment of the invention.

FIG. 1 shows a system 100 for registering sensors S1, S2, S3, S4 according to an embodiment of the invention. Optional components and optional data processing are shown in dashed-lines.

System 100 includes an interface 110 adapted to receive a query Q. The query is related to a specific event for a target system state, where the specific event is associated with a specific activity pattern 132.

A user submits queries to interface 110. A query can be formulated in natural language, graphical user interface commands, and combinations thereof. Typically, interface 110 enables ordinary persons to submit queries. Interface 110 could receive, for example, a natural language input such as "System, notify me when a fire hazard is possible in my house" via a microphone or a keyboard. Interface 110 could also receive a selection of graphical elements shown on a graphical user interface, where the selection defines the query by the combination of symbols representing 'Notification', 'Fire hazard', and 'Possibility'. Alternatively, the user might specify the graphical elements with natural language annotations or predefine groups of symbols into a corresponding graphical element to define a certain semantic meaning.

In the above example, 'Notify' is a specific event which is triggered when the target system state 'Fire hazard' can occur. Specific events are typically events which can be triggered by computer system 100. Such events include, but are not limited to, turning off gas, adjusting the heating and/or lighting, sending and receiving notifications, etc.

Figure 2:
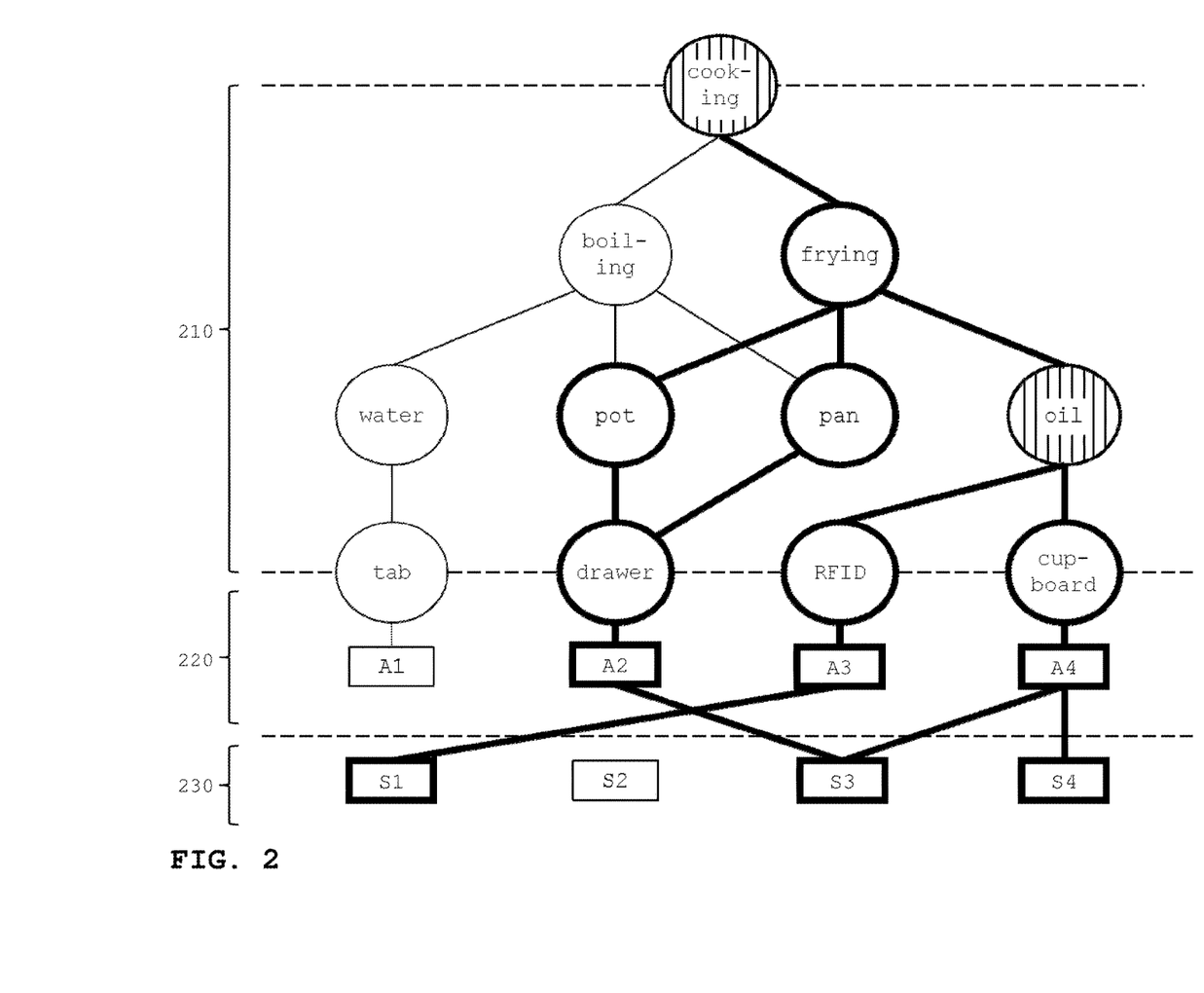
FIG. 2 shows an illustration of behavioral data, activity data structures, and sensors according to an embodiment of the invention.

Behavioral data 131, activity pattern 132, activity data structures A1, A2, A3, A4 and assigned sensors S1, S2, S3, and S4 are illustrated in FIG. 1. FIG. 2 provides a more detailed illustration including examples for structures and relations of behavioral data 131/210, activity data structures A1, A2, A3, and A4, and associated sensors S1, S2, S3, and S4.

FIG. 1 and FIG. 2 use bold lines and hatched fillings to differentiate symbols. A hatched filling indicates that the element of the behavioral data was retrieved based on a semantic expression received as part of the query; a bold line indicates that the illustrated symbol in the figure was retrieved by interpreting the structure and relations of the behavioral data.

Behavioral data 131 and activity data structures A1, A2, A3, and A4 can be implemented by non-relational data-bases, also referred to as NoSQL ("Not only SQL") data-bases. Categories of NoSQL data-bases include, for example, key-value stores, document stores, and graph data-bases. A person skilled in the art will select a data-base type most appropriate for a specific implementation.

The description now proceeds with FIG. 2. Afterwards, the description will return to FIG. 1.

FIG. 2 shows behavioral data 210, activity data structures 220, and sensors 230 according to an embodiment of the invention. FIG. 2 is a more detailed illustration of behavioral data, the activity data structures, and the sensors of FIG. 1.

Behavioral data 210 stores elements and dependencies for the behavior 'cooking' in a tree graph. The root of the tree is at the top of the figure, and the leaves are at the bottom. The root describes the respective behavior and the leaves are the elements which are associated with corresponding activity data structures for monitoring the behavior. Behavioral data 210, for example, includes the following dependencies for 'cooking':
  'cooking' includes 'boiling and 'frying'; 'boiling' requires
    'water' and a 'pot' or a 'pan'; 'water' can be poured
    from a 'tab'; a 'pot' or a 'pan' can be taken from the
    'drawer';
  'frying' requires also a 'pot' or a 'pan', and 'oil' (bottle)
    can be taken from the 'cupboard'. The oil bottle has an
    'RFID' chip attached in order to monitor its placement.

Behavioral data 210 can also be expressed with a rule base, where a vertical bar (|) represents the logical OR, a symbol (&) represents a logical conjunction, and an arrow (←) represents an implication. The rule base is as follows:
  cooking←boiling|frying
  boiling←water & (pot|pan)
  water←tab
  pot|pan←drawer
  frying←oil & (pot|pan)
  oil←RFID& cupboard.

For the example query in the description of FIG. 1 ("System, notify me when a fire hazard is possible in my house."), a parsing (decomposing) could provide semantic expressions. The semantic expressions could be obtained from a knowledge data-base which stores respective data, for example, in a table (e.g., using a relational data-base). An example for such a knowledge data-base could be:

| | | |
|---|---|---|
| fire hazard | main causes | cooking |
| | | open fireplace |
| | | portable heater |
| | | smoking |
| | possibility for combinations of | cooking + ignitable object on stove + stove on + no attendance |
| | | open fireplace + something ignitable nearby |
| | | portable heater + openings covered |
| | | smoking + falling asleep |
| ignitable object | oil, dry food, paper, . . . | |

Considering only 'cooking', the Mowing semantic expressions are obtained:
  {cooking,ingredient:ignitable, stove:on, attendance:no}
  Based on 'cooking', behavioral data 210 could be retrieved. Furthermore, other behavioral data for 'attendance:no' and 'stove:on' could be identified (not shown in the figures). However, in the example, the semantic expression 'ingredient:ignitable' cannot be retrieved from behavioral data structure 210. Thus, the knowledge data-base can be checked. The following additional information for 'ingredient:ignitable' may be obtained:
  {oil, dry food, paper, . . . }
  Obtaining new semantic information, 'oil' can also be identified in behavioral data 210. By further evaluating behavioral data 210, the following nodes/elements can be retrieved:
  {cooking, oil, frying, pan, pot, drawer, RFID, cupboard}

In FIG. 2, 'cooking' and 'oil' are shown hatched (identified from semantic expressions) and the remaining elements are shown with bold lines (evaluated based on the semantic expressions). The elements which are leaves of the tree stored in the behavioral data ('drawer', 'RFID', 'cupboard') represent the activity patterns. The multiplicity of activity data structures is characterized by this activity pattern and determines the respective sensors. Each activity data structure has knowledge about the sensors required for monitoring the respective real-world aspects.

Sensor data obtained by sensors 230 can be binary data (e.g., 'yes|no' or '1|0'). Thus, the data represented by activity data structures can also be binary. Sensors 230 can obtain more complex data, so that activity data structures 220 can represent more complex data. However, the dependencies defining the activity pattern are included in the behavioral data 210. Therefore, only the activity pattern addresses the semantic information in the query, not single activity data structure or sensor.

Behavioral data 210 is simplified in the illustration. In another embodiment 'cooking' may be included in behavioral data 210 or provided by other behavioral data, for example, the status of the stove.

The node 'boiling' is not retrieved, because in behavioral data 210, 'boiling' does not include an ignitable ingredient. Generally speaking, in behavioral data represented by a tree, only the paths which include an identified semantic expression are retrieved. When only the root (i.e., the human behavior) is provided, all paths/leaves of the tree are retrieved. Reducing the number of potential paths in the behavioral data in compliance with the semantic expressions derived from the original query allows selecting a relevant subset of all available sensors only. This helps to reduce energy consumption at the sensor level because sensors not required in the context of the received query can stay in a sleep mode. Further, the required bandwidth for communication between the sensors and the system may be reduced as less sensor data is received (received only from registered sensors).

Returning to the example of FIG. 1, the associated specific activity pattern 132 is associated with multiple activity data structures 133. Activities defined by an activity data structure are activities which may be performed within a context, and, for example, can be triggered by persons. Non-limiting examples of such activities include opening a cupboard, falling asleep, leaving a certain area, etc. That is, activities defined by an activity data structure are activities applied to the associated leaf node in the context of the query semantics. These activities can be monitored by sensors S1, S2, S3, and S4 available in the respective area (e.g., a building). The sensors are assigned to the activity data structures by, for example, storing the IP address(es) of the respective sensor(s). Any other appropriate mapping structure may be used instead.

The relationship between activity data structures and sensors can be complex. For instance, an activity data structure can have multiple sensors assigned for monitoring a person's presence in a room. One of these sensors could be monitoring if the door is open. This particular sensor could also be assigned to another activity data structure which monitors the dropping of the temperature in the room.

Queries received via interface 110 may be freely formulated by the user, as a semantic interpretation of the query and the respective semantic relations between the specific event and the target system state, as well as other factors, such as, time dependencies, probabilities, and spatial relationships.

Thus, decomposer 120 is configured to decompose query Q into semantic expressions QSe1, QSe2 describing the target system state, and to identify a database entry 121 associated with a semantic expression resulting from the decomposition. Also refer to the table in the description of FIG. 2 for additional information of the description of decomposer 120.

For example, for the query "System, notify me when a fire hazard is possible in my house" decomposer 120 requires further information on how fire hazards are caused. Decomposer 120, therefore, utilizes a knowledge data-base for identifying at least one entry 121 which provides semantic information on causes for fire hazards. One cause for a fire hazard could be, for example, an open fireplace and something ignitable in its proximity. Further, cooking can include ignitable objects as well as an active stove. A possibility for the fire hazard to occur could be, for example, when a person starts cooking and then leaves the stove unattended while having something ignitable placed on the active stove.

Decomposer 120 can then provide the at least one database entry 121 associated with a semantic expression to retriever 130. Retriever 130 is configured to retrieve behavioral data 131 which corresponds to the at least one identified database entry 121, wherein the behavioral data 131 includes dependencies between elements of the behavioral data structure describing activity pattern 132. The specific activity pattern may be associated with a plurality of activity data structures 133.

For example, 'cooking' could be represented by behavioral data 131. Behavioral data 131 is depicted in FIG. 1 as a specific graph (i.e., a tree) with the elements root, nodes, and leaves, wherein the root and the leaves are specific nodes. The root resembles the behavior 'cooking' and the leaves are associated with specific physical items or human activities/activities within a context which can be monitored by sensors. The leaves, thus, relate to specific activity data structures A1, A2, A3, and A4. The other nodes in between the root and the leaves can represent physical items or instances of the specific human behavior 'cooking'. That is, any node of the behavioral structure may be a relevant item with regards to the identified semantic expression of the query.

Data-base entries 121 provided by decomposer 120 are semantically matched to nodes (and leaves) of the tree stored in the behavioral data. For example, as mentioned previously, a fire hazard could happen when an ignitable object is included. Behavioral data 131 might not have a node/leave corresponding to 'ignitable object'. In this case the behavioral data cannot fully be matched with the query semantics. Therefore, retriever 130 could request further information from decomposer 120 regarding the semantic interpretation of 'ignitable object'. Decomposer 120 may interpret 'ignitable, object', as, for example, 'oil'.

Retriever 130 may now be able to match 'oil' to a node in behavioral data 131. This leads to the completion of all paths in the human behavior data structure (from the root node to respective leaf nodes), which are relevant paths in the semantic context of the query. Further, retriever 130 may evaluate behavioral data 131 in order to identify a specific activity pattern. In FIG. 1, identified activity pattern 132 does include a selection of leaves of behavior data 131. Activity pattern 132 may be found because behavioral data 131 also represents that the 'oil' could be stored in a cupboard, be tagged with an RFID chip, and be used when frying something with a pan on a stove. This behavior for 'cooking' is included in the semantic structure of the tree stored in behavioral data 131.

Nodes/leaves which are defined by activity pattern 132 are associated with activity data structures 133. As described above, an activity data structure A1, A2, A3, and A4 could represent 'opening cupboard' which has one or more sensors assigned. A single activity data structure A1, A2, A3, and A4 can be used to select specific sensors for monitoring a specific activity or contextual state. However, such a single activity data structure is not appropriate to address a specific user query which is related to the behavior of persons, because a single activity data structure represents only part of a complex behavior. In contrast, activity pattern 132 identified in behavioral data 131 provides a semantic dependency for activity data structures 133 according to the query.

In an embodiment of the invention, behavioral data 131 can include temporal dependencies (not illustrated) between elements of the behavioral data describing the specific activity pattern. For example, before 'oil' can be accessed in a cupboard, the cupboard has to be opened. This means, that first the sensor associated with the activity structure 'opening cupboard' must provide sensor data before sensor data of the sensor associated with activity structure for 'taking oil' is relevant. Temporal dependencies can be expressed, for example, by Interval Temporal Logic (ITL), Computational Temporal Logic (CTL), or Linear Temporal Logic (LTL).

In an embodiment, behavioral data 131 includes spatial dependencies (not illustrated) between elements of the behavioral data describing the specific activity pattern. For example, a 'fire hazard' can happen when a person leaves the kitchen during 'cooking'. Spatial dependencies can be expressed, for example, by Qualitative Spatial Reasoning or Quantitative Spatial Reasoning.

In an embodiment, behavioral data 131 includes probabilistic dependencies between elements of the behavioral data structure describing the specific activity pattern. For example, when something ignitable is left unattended on a stove for more than 8 minutes, the probability for a lire hazard is described as 60% or more. When this probability level is reached, an event may be triggered to address the (unwanted) target system state. Probabilistic dependencies can be expressed, for example, by Probabilistic Logic Networks (PLN) or Markov Logic Networks.

According to an embodiment of the invention, temporal, spatial, and/or probabilistic dependencies are combined. For example, probability can rise or fall over time, or, probability can rise/fall when a person cooks and leaves first the kitchen into another room of the house and then leaves the house.

Registration component 140 registers at least one sensor S1, S3, or S4 which is assigned to the multiple activity data structures 133 defined by activity pattern 132. Registration can be done, by, system 100 storing the IP addresses of the respective sensors.

The data-base utilized for decomposing a query and the data-base including behavioral and activity data structures can be part of system 100; they can also be at a remote location and be accessed via appropriate interfaces/networks. This is indicated in FIG. 1 by the data-bases being placed on the border of system 100. Behavioral data and activity data structures can also be stored in separate data-bases.

In an embodiment, system 100 may use and/or combine multiple behavioral data structures 131 to identify respective activity patterns 132 and corresponding activity data structures A1, A2, A3, and A4 and sensors S1, S2, S3, and S4. For example, behavioral data for 'cooking' and behavioral data for 'attendance' may be used to identify a common activity pattern and the corresponding activity data structures for registering the respective sensors. This is indicated in FIG. 1 by the miniaturized version of other behavioral data.

In an embodiment, system 100 includes a first interface 170 for receiving sensor data from at least one sensor S1, S3, S4. Further, system 100 may include an inference component 180 for comparing the sensor data with the specific activity pattern 132, and include a second interface 190 for triggering the specific event E for a certain correlation between the sensor data and specific activity pattern 132.

For example, if inference component 180 receives sensor data 'stove on', 'cupboard open', 'oil taken' from sensors S1, S3, and S4 via interface 170, it may infer that a person is currently cooking. If additional sensors indicate that the person cooking has left the room, the probability of a fire hazard rises because the stove is unattended. After a certain time period, system 100 may send a notification E regarding the risk for a fire hazard via interface 190.

In FIG. 2, behavioral data 210, activity data structures 220, and the assignment of sensors 230 to activity data structures 220 may be provided by a provider of system 100 (cf. FIG. 1). Behavioral data 210 may represent semantic information which does not include all required data for operating system 100 (cf. FIG. 1) in the specific environment of the user.

Figure 1A:
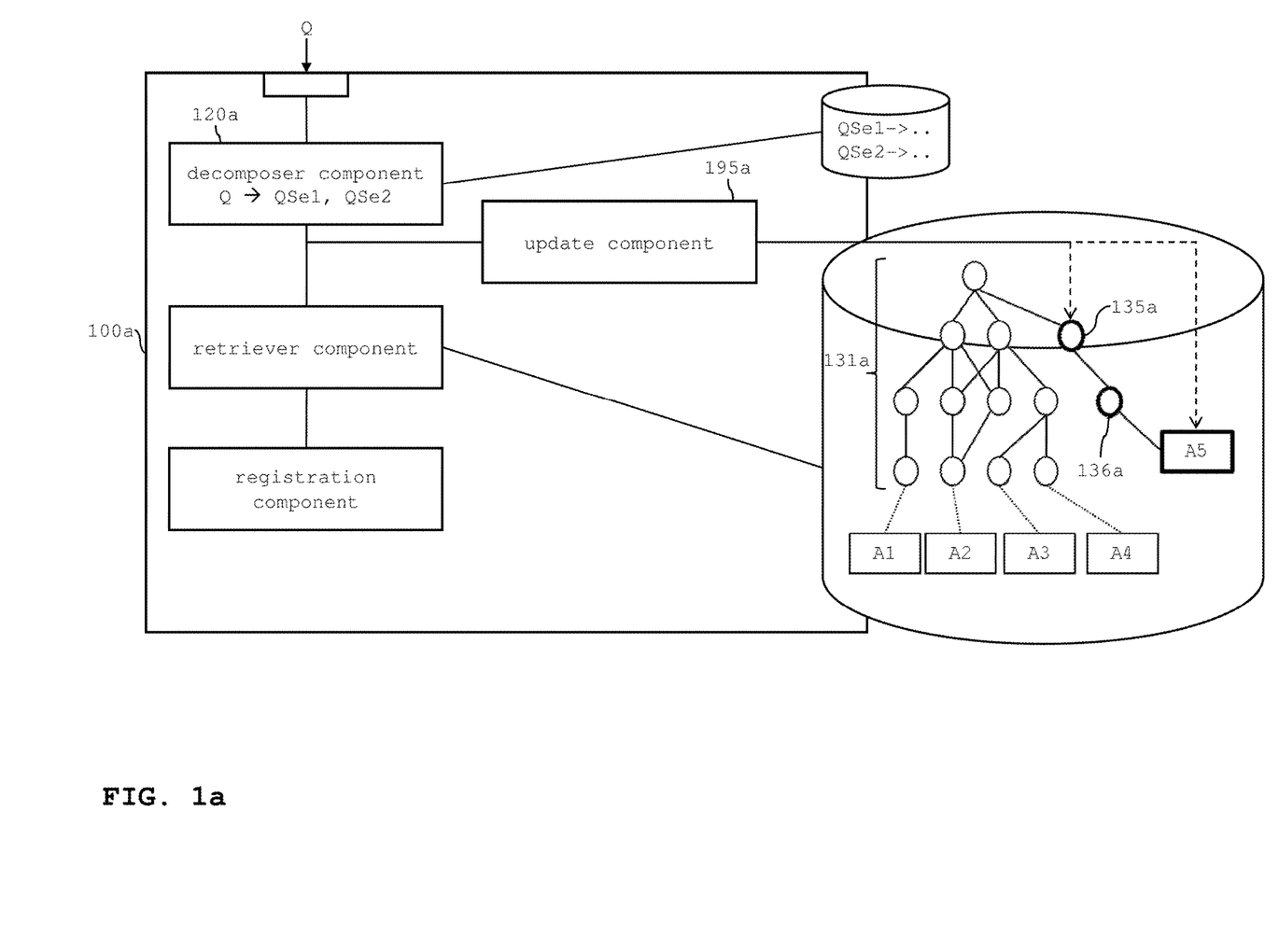
FIG. 1a shows a system for updating existing behavioral data according to an embodiment of the invention.

Thus, FIG. 1a shows a system 100a for updating existing behavioral data 131a according to an embodiment of the invention. An updater 195a updates existing behavioral data 210 (cf. FIG. 2) based on the query and the multiple activity data structures. For instance, the user may also steam vegetables on the stove. If, for example, the respective activity data structures for this activity are available and a user query includes "Notify me when all water has vaporized when steaming my vegetables", the updater could update behavioral data 210 (cf. FIG. 2) with node 135a representing 'steaming'. This new node may then be associated (potentially via other nodes 136a) with one or more activity data structures A5 which have sensors assigned for monitoring the water ratio in the pot or pan.

Figure 1B:
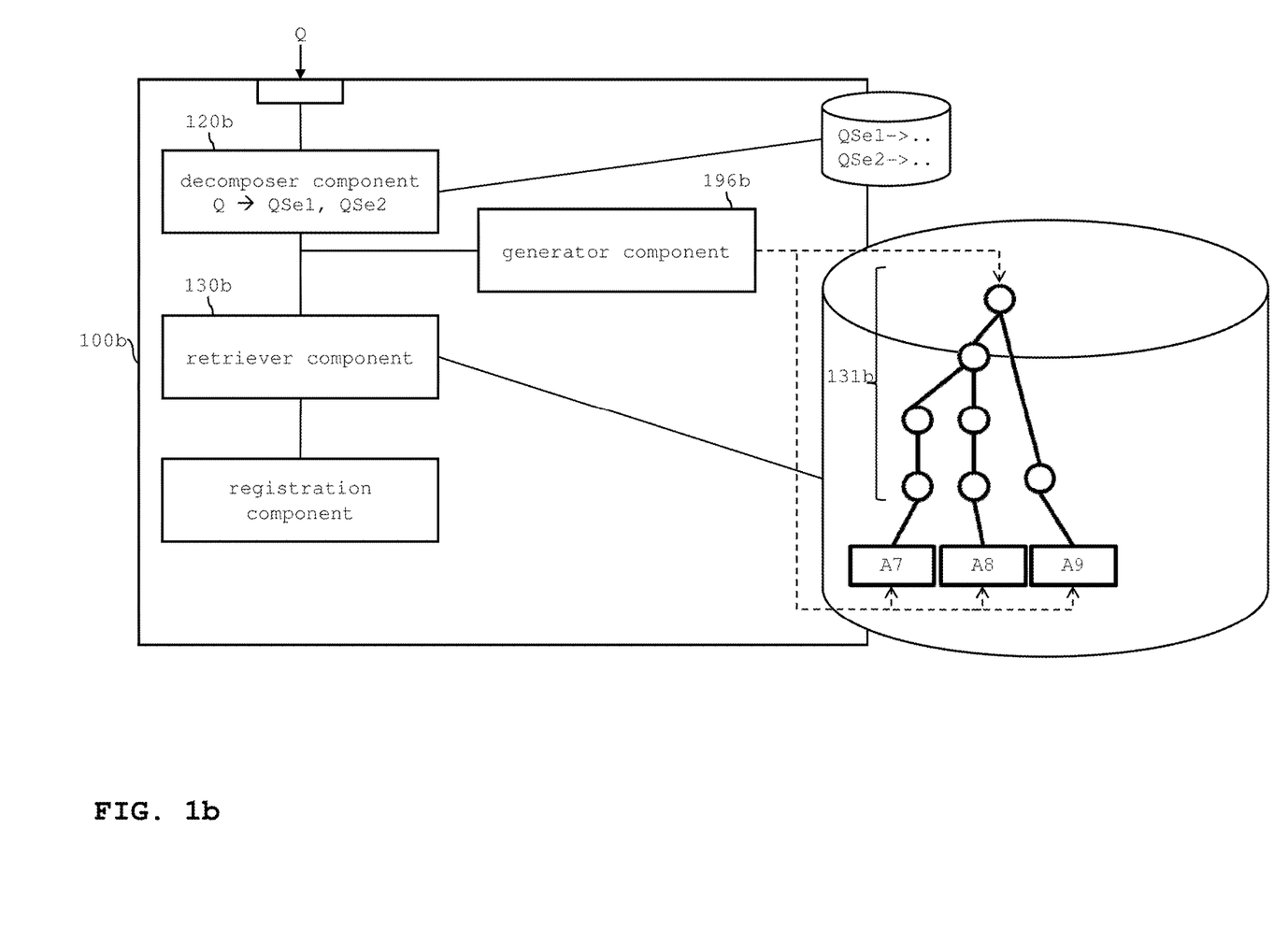
FIG. 1b shows a system for generating new behavioral data according to an embodiment of the invention.

FIG. 1b shows a system 100b for generating new behavioral data 131b according to an embodiment of the invention. A generator 196b generates new behavioral data 131b based on the query and the plurality of activity data structures. For example, decomposer 120b may also decompose from the query "System, notify me when a fire hazard is possible in my house." the semantic expression 'possible' which may be further evaluated by using the knowledge data-base to the semantic expression 'attendance:no'. Since retriever component 130b cannot retrieve behavioral data for 'attendance', generator 196b may generate new behavioral data 131b for this case. For example, activities such as 'falling asleep' or 'leaving a room' can be monitored by existing sensors which are assigned to activity data structures A7, A8, and A9. Thus, generator 196b is able to generate new behavioral data 131b based on the semantic expressions identified in the query and activity data structures A7, A8, A9.

In an embodiment of the invention, the generation of new (or initial) behavioral data as well as the update of existing behavioral data in a first environment may be transferred and deployed in a second environment. A first environment may be, for example, a typical residential building for training behavioral data. The second environment may be an actual residential house of a person having purchased a monitoring-system including the behavioral data trained in the first environment. Further, updated or new behavioral data trained in the actual residential house can also be transferred to other residential buildings.

In an embodiment, a third interface communicates an additional query to a user. For example, decomposer 120 or retriever component 130 (cf. FIG. 1) may not be able to decompose or retrieve data from the databases. Hence, a query is sent to the user, requesting a 'yes' or 'no' answer. The additional could ask the user "Is oil ignitable"? The answer may allow updating existing behavioral data or generating new behavioral data. Thus, the third interface can be used to receive complementary data from the use to enhance or complete existing behavioral data, so that the initial query semantics can be matched with the enhanced behavioral data.

Updater 195a (cf. FIG. 1a) and generator 196b (cf. FIG. 1b) can be realized by the implementation of algorithms in the field of machine learning, as, for example:
artificial neural networks;
genetic programming;
decision tree learning;
inductive logic programming;
clustering;
Bayesian networks;
Reinforcement learning;
representation learning; and
dictionary learning;

Activity data structures, semantic expressions derived from the query, and, if available, existing rules can serve as training input for the updater/generator for updating/generating the behavioral data against its target class (i.e., the behavior, such as 'cooking'). A person skilled in the art will select and apply appropriate machine learning algorithms to the training data and the respective target class.

FIGS. 3a-3e show a flow chart 300a, 300b, 300c, 300d, and 300e at different processing steps 310, 320, 330, 340, 350, 360, and 370 illustrating the registration of sensors S1, S2, S3, S4, S5, and S6 according to an embodiment of the invention. In the example in FIGS. 3a-3e the query Q: "Notify when fire hazard is possible" is received.

Figure 3A:
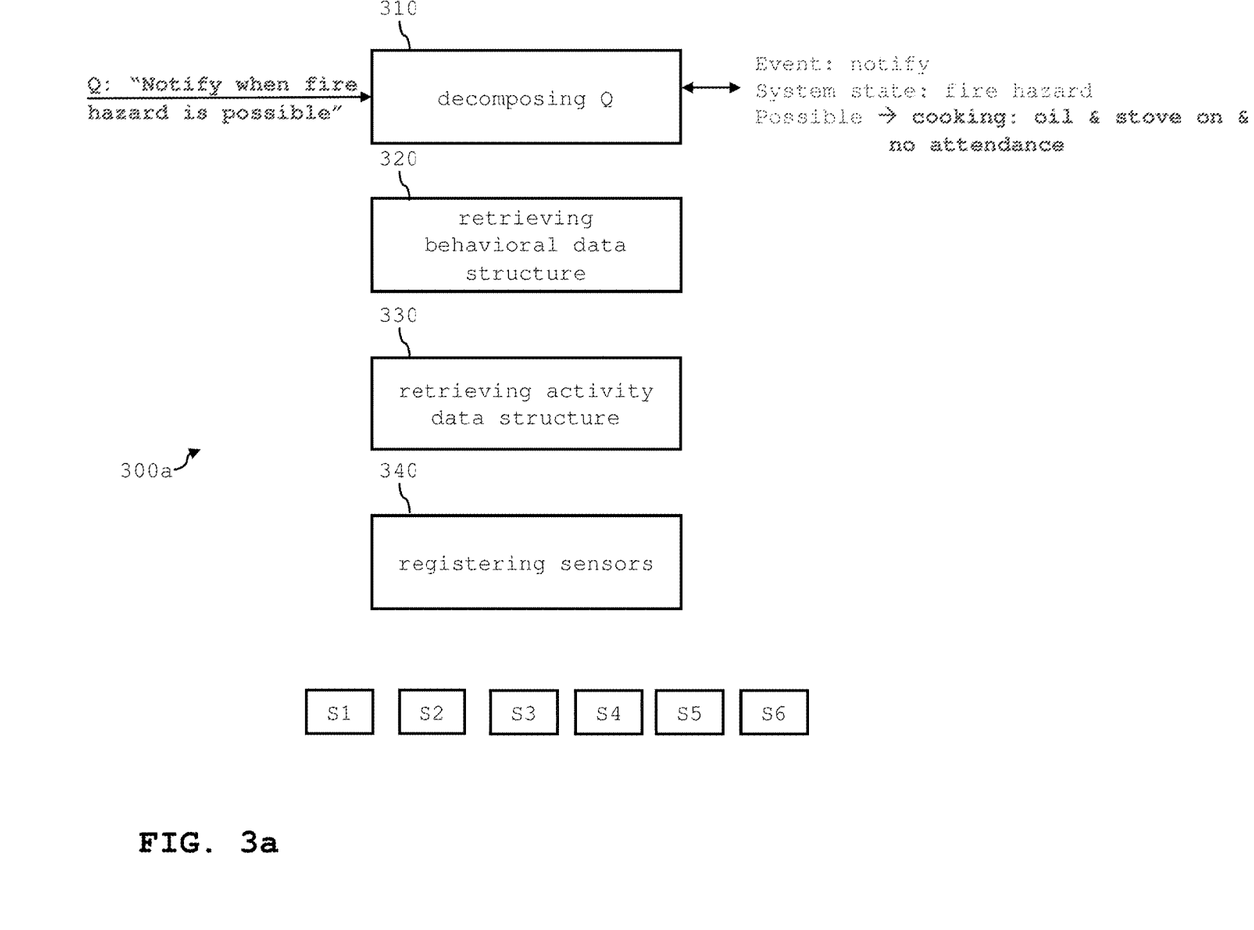
FIGS. 3a-3e show a functional flow chart at different processing steps illustrating the registration of sensors according to an embodiment of the invention.

At processing step 310 in FIG. 3a, query Q is decomposed into semantic expressions, for example:
Event: notify
System state: fire hazard
Possible→cooking: oil & stove on & no attendance Here, the decomposed target system state is 'fire hazard', and the event when this system state is possible includes a notification. The possibility is characterized by a combination of elements which can be monitored by sensors.

Figure 3B:
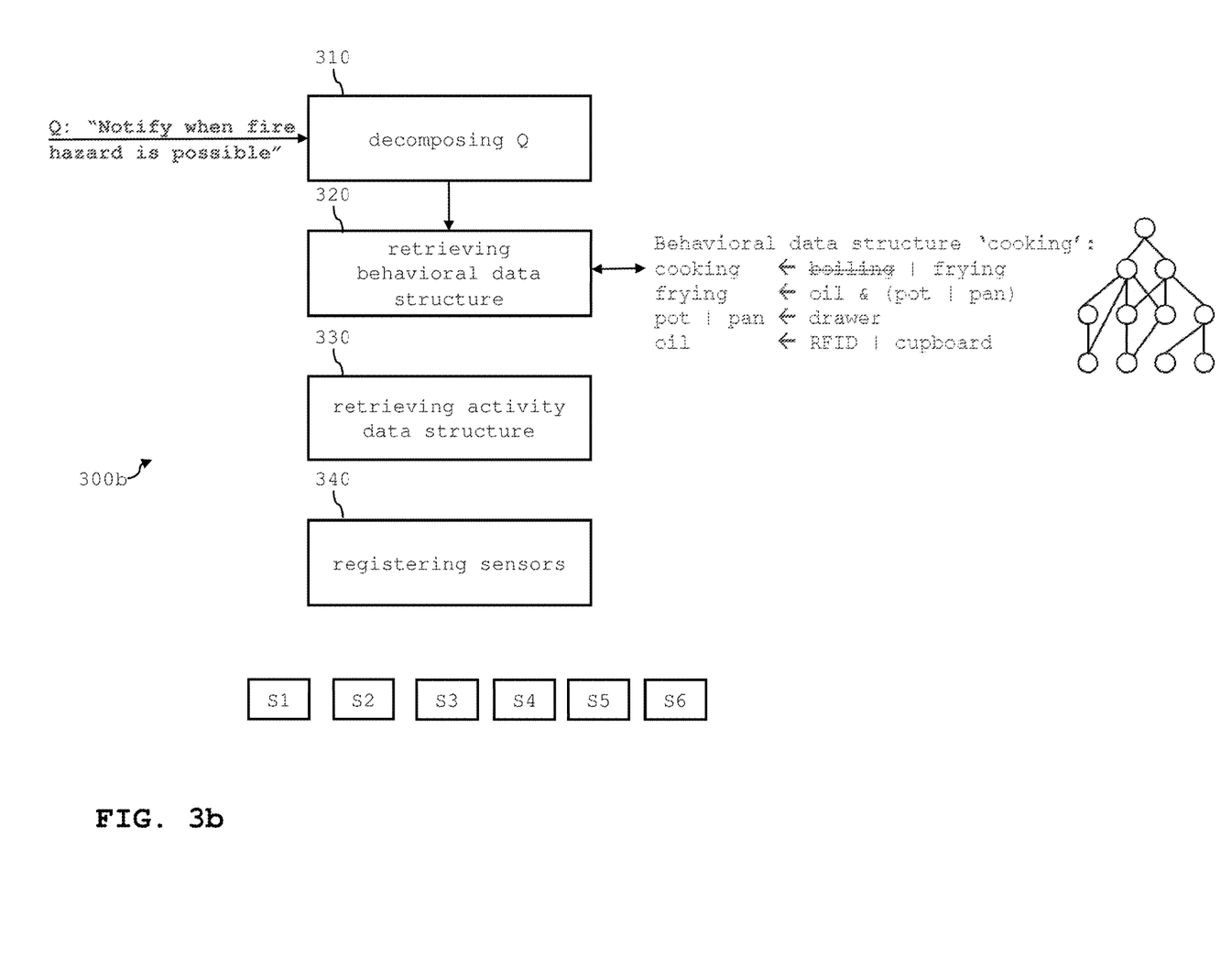

At processing step 320 in FIG. 3b, behavioral data for 'cooking' is retrieved and evaluated. The result is:
cooking←|frying
frying←oil & (pot|pan)
pot|pan←drawer
oil←id|cupboard The above retrieval example is based on behavioral data 210 (cf. FIG. 2). 'Boiling' is struck-through to indicate that 'boiling' cannot lead to a fire hazard according to this behavioral data. The result also describes a specific activity pattern for the query.

Figure 3C:
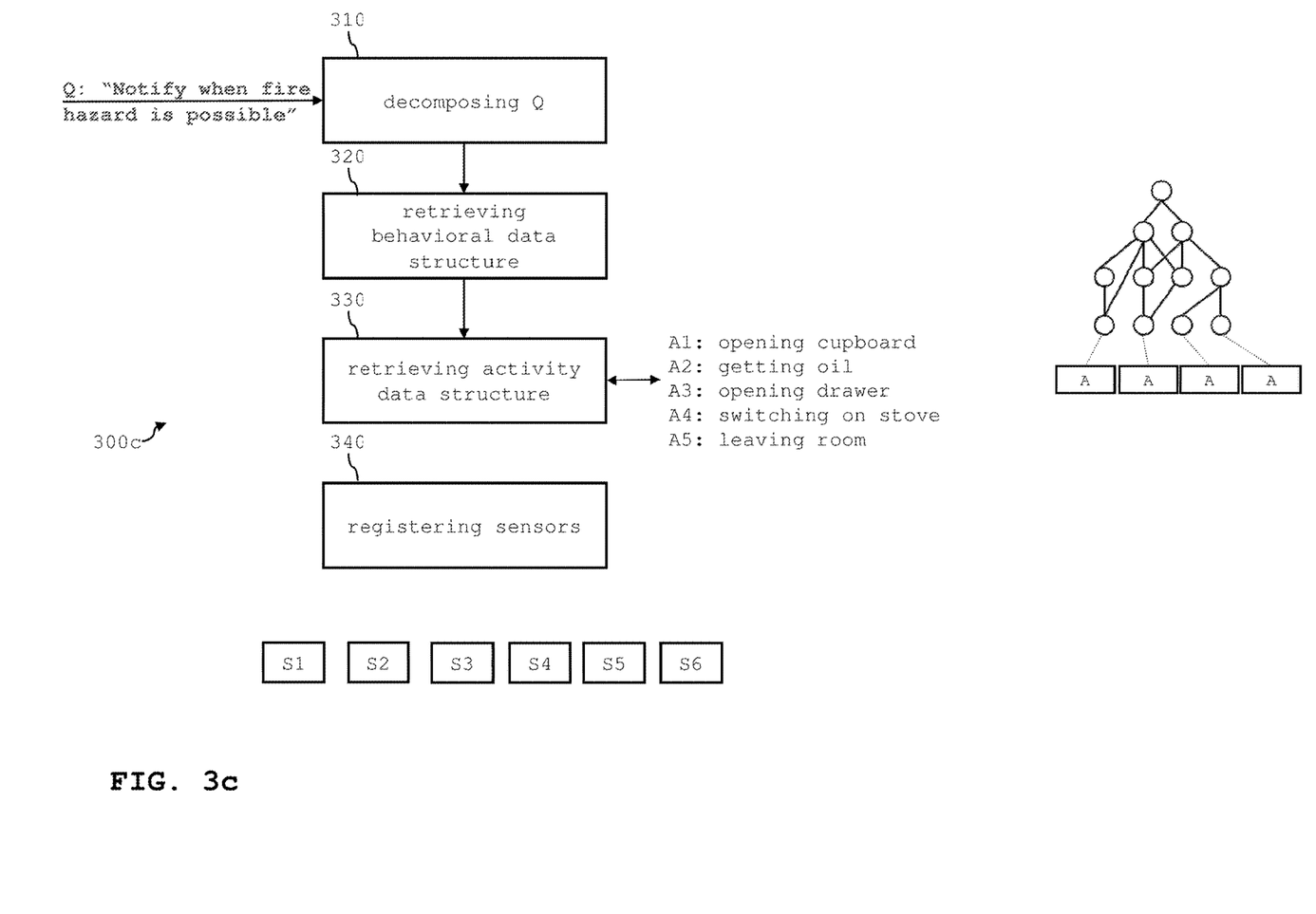
Figure 3D:
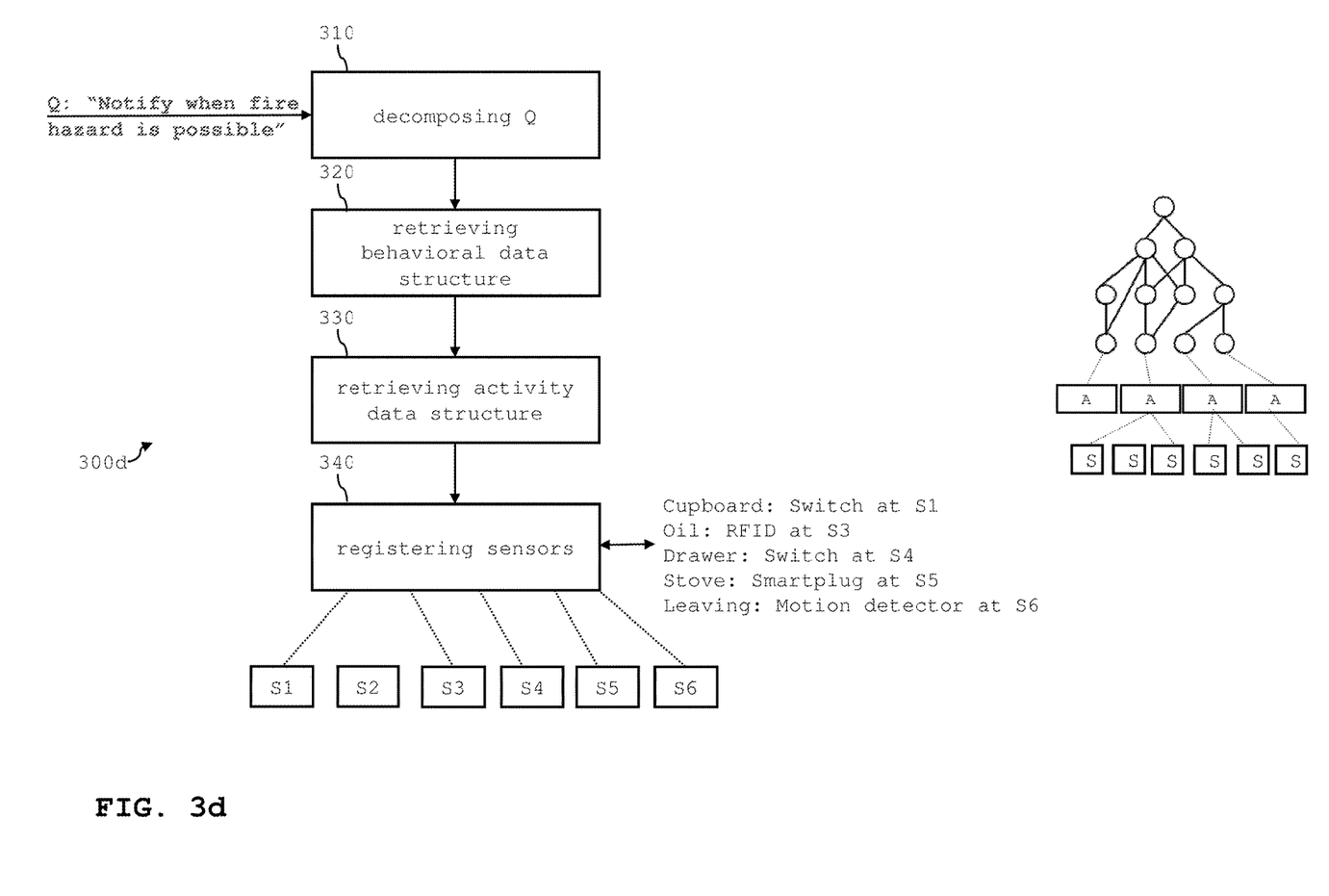

At processing step 330 in FIG. 3c, the specific activity pattern is used to retrieve associated activity data structures A1-A5:
A1: opening cupboard
A2: getting oil
A3: opening drawer
A4: switching on stove
A5: leaving room Activity data structures A1, A2, and A3 are retrieved based on dependencies within behavioral data 210 shown in FIG. 2. However, activity data structure A4 is retrieved based on an updated version of behavioral data 210 (cf. FIG. 2), and activity data structure A5 is retrieved based on other behavioral data (not shown in the figures).

Retrieved activity data structures A1-A5 represent activities for which corresponding sensors are available. At processing step 340 in FIG. 3e, corresponding sensors S1, S3, S4, S5 and S6 are registered:
Cupboard: Switch at S1
Oil: RFID at S3
Drawer: Switch at S4
Stove: Smartplug at S5
Leaving: Motion detector at S6

Figure 3E:
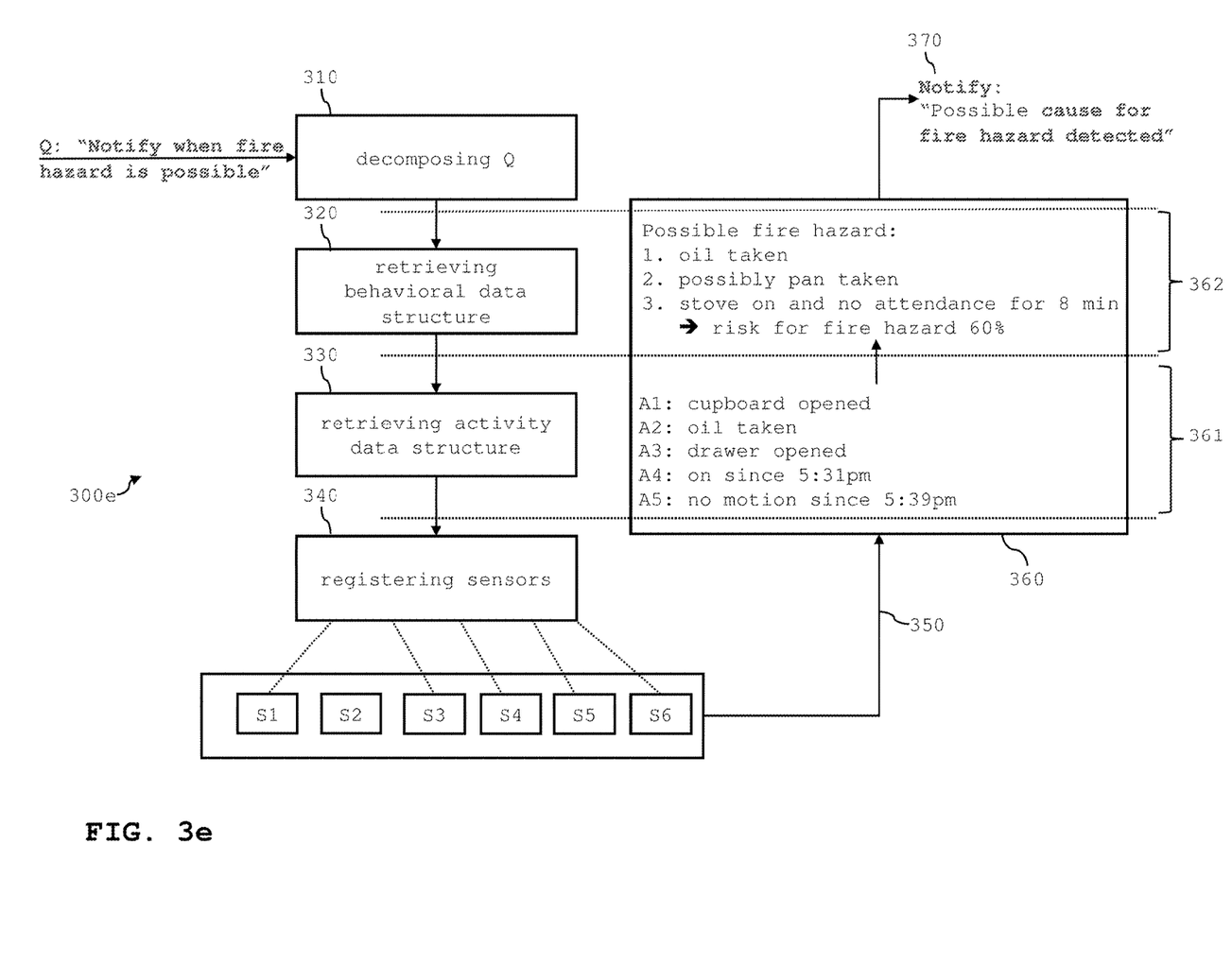

The sensors provide sensor data for monitoring the respective activity. For example, a switch attached to a cupboard provides binary data 'open' or 'closed'; a smartplug used for a stove, however, provides sensor data representing a time interval.

In FIG. 3e, sensor data from sensors S1, S3, S4, S5, and S6 is received 350 for inferring 360 (cf. inference component 180 in FIG. 1). Inference at level 361 of activity data structures A1 to A5 provides information about the status of each activity represented by the respective activity data structure. For example, sensor S1 provides the binary state "cupboard opened" which is interpreted at activity data structure A1 that the cupboard was opened and something might have been taken out. In FIG. 3e, inference on the activity data structures provides the following (not related) information:
A1: cupboard opened
A2: oil taken
A3: drawer opened
A4: on since 5:31 pm
A5: no motion since 5:39 pm Inference at level 362 of the behavioral data then consolidates the result of the inference on level 361 of the activity data structures. This consolidation (or semantic interpretation) provides semantic information regarding the behavior of a person. The inference on level 362 of the behavioral dataevaluates the information provided by the inference on level 361 of the activity data structures. The result of the inference on level 362 of the behavioral data corresponds to the query and can be used to address the query. In FIG. 3e, the inference on level 362 of the behavioral data provides the following information:
Possible fire hazard based on:
1. oil taken
2. possibly pan taken
3. stove on and no attendance for 8 min
→risk of fire hazard 60%

As a result, the event identified in the query is triggered 370. This means that a notification will be dispatched with the information "Possible cause of fire hazard detected."

In FIGS. 3b-3e a miniature version of behavioral data 210 (cf. FIG. 2), activity data structures and sensors are shown in order to indicate the relation to FIG. 2. However, the number of sensors and the assignment of sensors to activity data structures as well as the association of activity data structures to nodes of behavioral data 210 (cf. FIG. 2) may not be equivalent between FIG. 2 and FIGS. 3b-3e.

Figure 4:
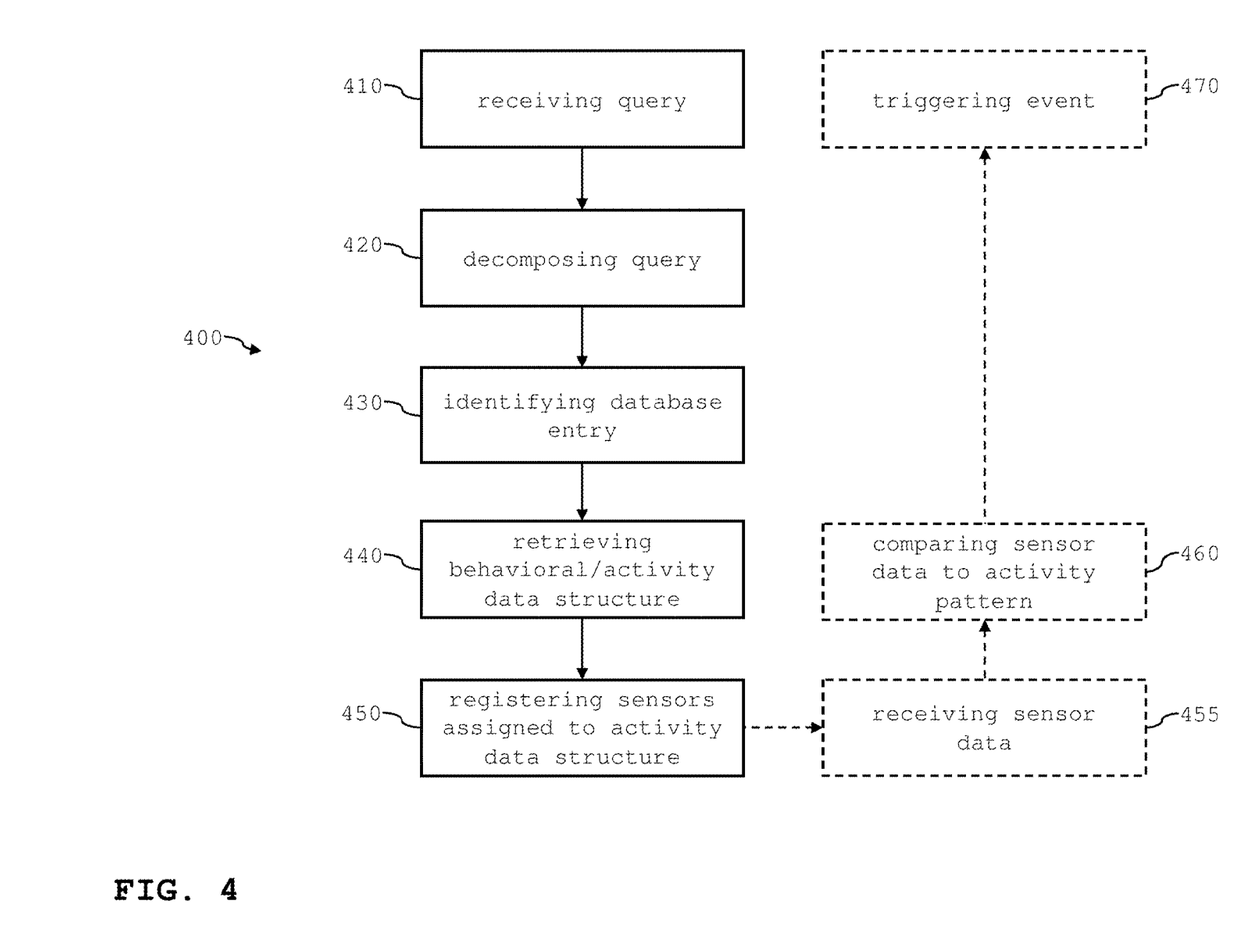
FIG. 4 is an exemplary flow chart of a computer method according to an embodiment of the invention.

FIG. 4 is an exemplary flow chart according to an embodiment of the invention, computer method 400. Method steps illustrated by dashed lines are optional. The method includes receiving 410 a query, wherein the query is related to a specific event for a target system state. The specific event is associated with a specific activity pattern. The method further includes decomposing 420 the query into semantic expressions describing the target system state, and identifying 430 a database entry associated with a semantic expression resulting from the decomposition. Then, retrieving 440 behavioral data which corresponds to the identified database entry, wherein the behavioral data includes dependencies between elements of the behavioral data describing the specific activity pattern. The specific activity pattern is associated with multiple activity data structures. The method further includes registering 450 at least one sensor, where the sensor is assigned to the multiple activity data structures. By executing method 400 the system can automatically select sensors that are useful for monitoring activities which a play a role in the semantic context of the query and which provide sensor data input for identifying a situation corresponding to an event trigger in response to the query. Therefore, sensors which are not relevant in the semantic context of the query are disregarded for reducing complexity and communication bandwidth requirements between sensors and the system, along with reduced energy consumption.

In an embodiment, the computer-implemented method further includes comparing 460 received sensor data 455 from a sensor with the specific activity pattern, and, for certain correlations between the sensor data and the specific activity pattern, triggering 470 the specific event.

In an embodiment, the computer-implemented method further includes generating new behavioral data based on the query and the plurality of activity data structures. This enables the system to automatically learn additional elements for covering the semantic context of a query. The behavioral data and the respective dependency knowledge for the elements of such structures is self-enhancing, thus allowing the system to respond to queries with increasing complexity over time without human interaction.

In an embodiment, the computer-implemented further includes updating existing behavioral data based on the query and the multiple activity data structures.

The method steps of computer-implemented method 400 can be executed in sequence or in parallel. Method steps can also be repeated or executed in loops. Repeating or executing method steps in loops may be required for further decomposing a query into semantic expressions, because it might not be possible to retrieve behavioral data and/or the respective activity pattern with the initially decomposed semantic expression.

Embodiments of the invention can be implemented in digital electronic circuitry, in computer hardware, firmware, software, or in combinations thereof. Embodiments of the invention can be implemented as a computer program product, for example, a computer program tangibly embodied in an information carrier, such as a machine-readable non-transitory storage device or medium, for execution by, or to control the operation of, data processing apparatus, such as a programmable processor, a computer, or multiple computers. A computer program product as claimed can be written in any form of programming language, including compiled or interpreted languages, and can be deployed in any form, including as a standalone program or as a module, component, subroutine, or other unit suitable for use in a computing environment. A computer program product according to embodiments of the invention can be executed on one computer or on multiple computers at one site or distributed across multiple sites interconnected by a communication network. The disclosed methods can be executed by corresponding computer products on the respective devices, such as the first and second computers, the trusted computers, and the communication means.

Method steps of embodiments of the invention can be performed by one or more programmable processors executing a computer program to perform functions of the invention by operating on input data and generating output. Method steps can also be performed by, and apparatus of embodiments of the invention can be implemented as, special purpose logic circuitry, for example, a field programmable gate array (FPGA) or an application-specific integrated circuit (ASIC).

Processors suitable for the execution of a computer program product according to embodiments of the invention include, but are not limited to, both general and special purpose microprocessors, and any one or more processors of any kind of digital computing device, including computing devices distributed over a network.

What is claimed is:

1. A computer system comprising a data processing apparatus for executing a computer program tangibly embodied in a machine-readable non-transitory medium for registering sensors, comprising:
    an interface adapted to receive a query, wherein the query is related to a specific event for a target system state, wherein the specific event is associated with a specific activity pattern;
    a decomposer configured to decompose the query into semantic expressions describing the target system state, and to identify a database entry associated with a semantic expression resulting from the decomposition;
    a retriever configured to retrieve behavioral data which corresponds to the identified database entry, wherein the behavioral data includes dependencies between elements of the behavioral data identifying the specific activity pattern, wherein the specific activity pattern is associated with a plurality of activity data structures; and
    a registration component configured to register at least one sensor, wherein the at least one sensor is assigned to the plurality of activity data structures.

2. The computer system of claim 1, further comprising:
    a first interface adapted to receive sensor data from the at least one sensor;
    an inference component configured to compare the sensor data with the specific activity pattern; and
    a second interface component adapted to trigger the specific event in case of a certain correlation between the sensor data and the specific activity pattern.

3. The computer system of claim 1, further comprising:
    a generator component configured to generate new behavioral data based on the query and the plurality of activity data structures.

4. The computer system of claim 1, further comprising:
    an updater configured to update existing behavioral data based on the query and the plurality of activity data structures.

5. The computer system of claim 1, further comprising:
    a third interface adapted to communicate a query to a user.

6. The computer system of claim 1, wherein the dependencies included in the behavioral data are temporal dependencies.

7. The computer system of claim 1, wherein the dependencies included in the behavioral data are spatial dependencies.

8. The computer system of claim 1, wherein the dependencies included in the behavioral data are probabilistic dependencies.

9. The computer system of claim 1, wherein the query is received by a natural language input.

10. The computer system of claim 1, wherein the query is received by an input of at least one graphical element corresponding to at least one element of the behavioral data or the plurality of activity data structures.

11. A computer implemented method for registering sensors, the method comprising:
    receiving a query, wherein the query is related to a specific event for a target system state, wherein the specific event is associated with a specific activity pattern;
    decomposing the query into semantic expressions describing the target system state;
    identifying a database entry associated with a semantic expression resulting from the decomposing;
    retrieving behavioral data which corresponds to the identified database entry, wherein the behavioral data includes dependencies between elements of the behavioral data identifying the specific activity pattern, wherein the specific activity pattern is associated with a plurality of activity data structures; and
    registering at least one sensor, wherein the at least one sensor is assigned to the plurality of activity data structures.

12. The computer implemented method of claim 11, further comprising:
    comparing received sensor data from the at least one sensor with the specific activity pattern; wherein if there is a certain correlation between the sensor data and the specific activity pattern then triggering the specific event.

13. The computer implemented method of claim 11, further comprising:

generating new behavioral data based on the query and the plurality of activity data structures.

14. The computer implemented method of claim 11, further comprising:
updating existing behavioral data based on the query and the plurality of activity data structures.

15. A non-transitory storage medium comprising a computer program instructions, which, when loaded into a memory of a computing system and executed by at least one processor of the computing system, performs the steps of a computer implemented method comprising:
receiving a query, wherein the query is related to a specific event for a target system state, wherein the specific event is associated with a specific activity pattern;
decomposing the query into semantic expressions describing the target system state;
identifying a database entry associated with a semantic expression resulting from the decomposing;
retrieving behavioral data which corresponds to the identified database entry, wherein the behavioral data includes dependencies between elements of the behavioral data identifying the specific activity pattern, wherein the specific activity pattern is associated with a plurality of activity data structures; and
registering at least one sensor, wherein the at least one sensor is assigned to the plurality of activity data structures.

16. The computer program product of claim 15, wherein the method further comprising:
comparing received sensor data from the at least one sensor with the specific activity pattern; wherein if there is a certain correlation between the sensor data and the specific activity pattern then triggering the specific event.

17. The computer program product of claim 15, wherein the method further comprising:
generating new behavioral data based on the query and the plurality of activity data structures.

18. The computer program product of claim 15, wherein the method further comprising:
updating existing behavioral data based on the query and the plurality of activity data structures.

* * * * *